United States Patent
Wicklund

[19]

[11] Patent Number: 6,105,304
[45] Date of Patent: Aug. 22, 2000

[54] ELASTOMER FISHING LURE SKIRT

[76] Inventor: Craig Wicklund, 3780 Bayside Rd., Orono, Minn. 55356

[21] Appl. No.: 09/231,935

[22] Filed: Jan. 14, 1999

[51] Int. Cl.[7] .................................................. A01K 85/00
[52] U.S. Cl. ........................ 43/42.25; 43/42.28; 43/42.24
[58] Field of Search ................... 43/42.28, 42.24, 43/42.25, 42.27, 42.29, 42.3

[56] References Cited

U.S. PATENT DOCUMENTS

| | | | |
|---|---|---|---|
| 2,018,622 | 10/1935 | Davenport | 43/42.53 |
| 2,413,344 | 12/1946 | Willman | 43/42.25 |
| 2,546,437 | 3/1951 | Gambill | 43/42.28 |
| 3,021,632 | 2/1962 | Gombar | 428/172 |
| 3,122,853 | 3/1964 | Koonz et al. | 43/42.24 |
| 3,245,171 | 4/1966 | Henry | 43/42.1 |
| 3,685,197 | 8/1972 | McClellan | 43/42.24 |
| 3,940,869 | 3/1976 | Robers | 43/42.53 |
| 4,074,454 | 2/1978 | Cordell, Jr. | 43/42.28 |
| 4,335,495 | 6/1982 | Buchanan | 29/428 |
| 4,429,482 | 2/1984 | Honse | 43/42.32 |
| 4,468,881 | 9/1984 | Gordon, III | 43/42.25 |
| 4,771,568 | 9/1988 | Head | 43/42.29 |
| 5,039,745 | 8/1991 | Riddle | 525/101 |
| 5,045,360 | 9/1991 | Kosal et al. | 427/387 |
| 5,085,894 | 2/1992 | Pascucci et al. | 427/387 |
| 5,134,801 | 8/1992 | Davey | 43/42.28 |
| 5,261,182 | 11/1993 | Link | 43/42.36 |
| 5,491,927 | 2/1996 | Ortiz | 43/42.28 |

*Primary Examiner*—Michael J. Carone
*Assistant Examiner*—Son T. Nguyen
*Attorney, Agent, or Firm*—Haugen Law Firm PLLP

[57] ABSTRACT

An elastomer fishing lure skirt having a feathered distal portion for creating a pulsating and undulating action in the skirt as it moves through the water. The skirt includes a plurality of filaments bound to one another, each filament including a first segment and a second segment. Each filament further includes a proximal section, a distal section of lesser cross sectional dimension, and a tapered section disposed intermediate the proximal and distal sections. The tapered section and distal section form a feathered portion that pulsates and undulates when the skirt is in use.

8 Claims, 2 Drawing Sheets

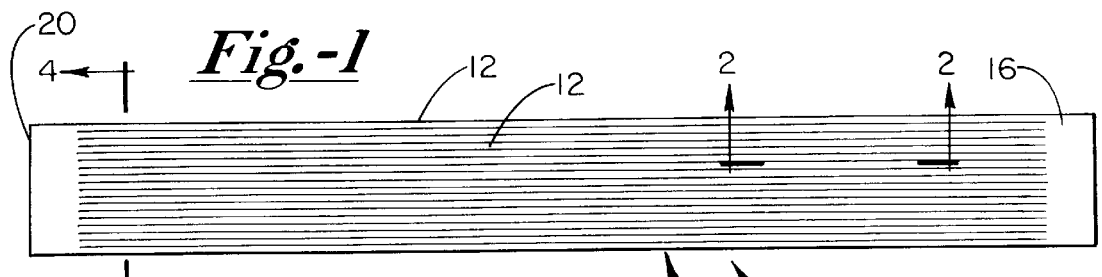
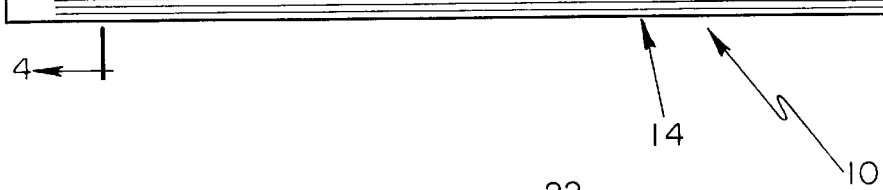
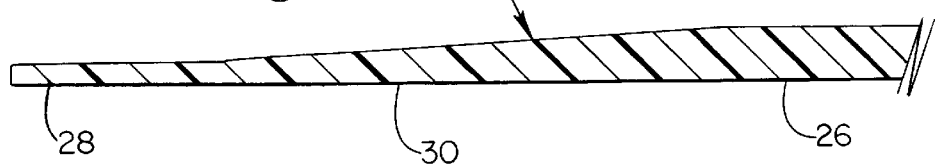
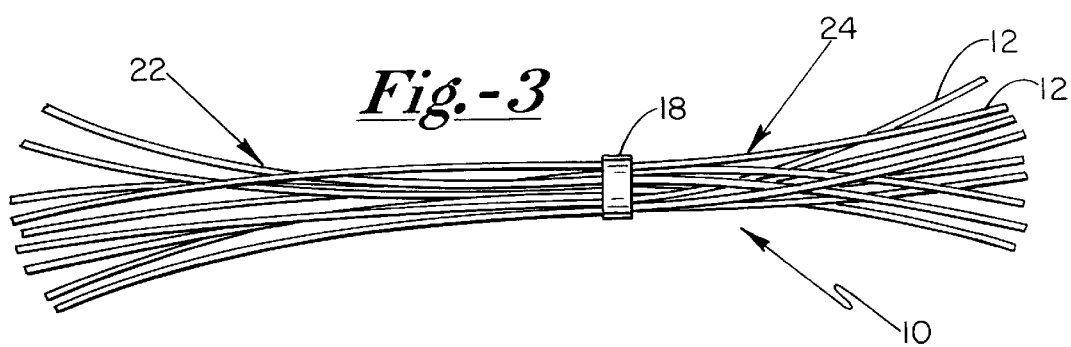
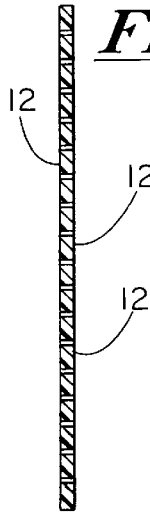
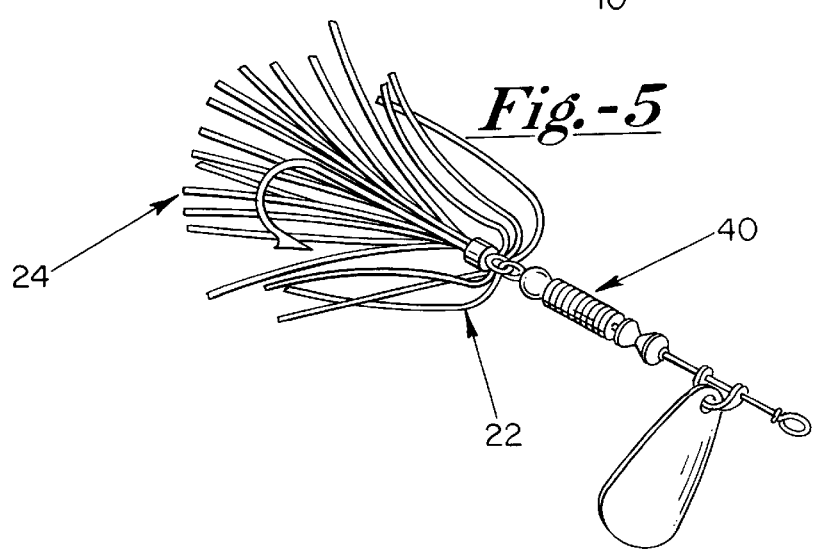

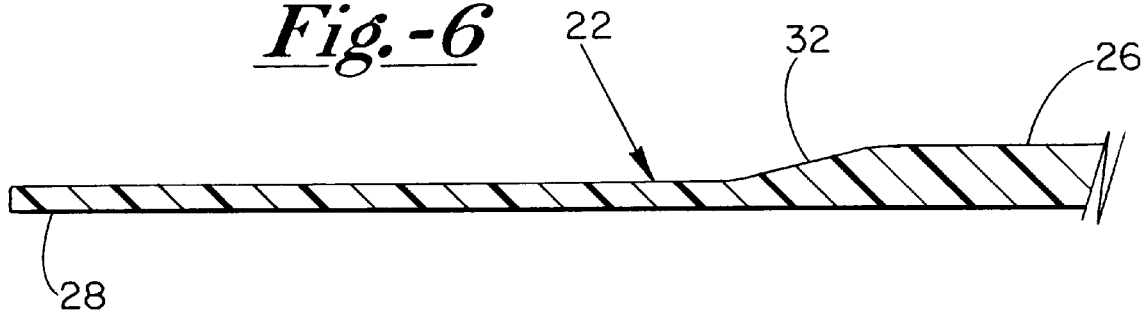

ELASTOMER FISHING LURE SKIRT

BACKGROUND OF THE INVENTION

1. Field of the Invention

The present invention relates to fishing lures and components for use therewith and more particularly pertains to a silicone-based skirt having a tapered section leading to a feathered distal portion for creating a pulsating or undulating action in the skirt as it moves through the water.

2. Description of the Prior Art

The use of silicone-based skirts is known in the prior art. Particular reference should be had to my U.S. Pat. No. 5,251,395, herein incorporated by reference, wherein a silicone based elastomer substrate is formed into a lure dressing or skirt that includes a plurality of slit, filamentary strips. The substrate is pattern printed with one or more clear or pigmented silicone based colorants that are appropriately bonded in place. A metalized foil may be optionally bonded to the colorant before or after curing. Once colored, the substrate is die cut into a number of dressings. Each dressing includes a plurality of filaments that are bound together via a strap fastener to form a skirt. The skirts are separately attachable to a lure of choice using conventional attachment means.

Further, lures that simulate the movement of live bait are well know in the prior art. U.S. Pat. No. 2,161,094 to Saunders, Jr. discloses a lure that simulates in its motions or actions minnows and like. To effect this motion, a sheet of rubber or the like that is suitably connected to a body is provided with slits, the slits further having additional slits formed at rear ends thereof.

U.S. Pat. No. 3,060,620 to Arbogast discloses a buck-tail or fly which has life-like movement upon being placed in water, independent of any translational movement through the water. A plurality of substantially parallel stands or streamers having a water-absorbing substance impregnated into the surface on one side thereof are secured to the stem of a hook. When the buck-tail is placed in water, the swelling of the water-absorbing substance expands a side of each strand thereby causing the same to curl in the manner of squirming objects.

U.S. Pat. No. 4,712,325 to Smith discloses a fishing lure which includes a plurality of thin, elongate strips of chamois attached to a body rearwardly of a head portion and extending outwardly therefrom. The porous chamois material absorbs water to swell in size and become flexible when the lure is immersed in water, giving the lure a life-like appearance. U.S. Pat. No. 3,959,912 to Lee discloses a lure including a skirt which comprises a plurality of individual elongated plastic members to the ends of which are, in turn, integrally attached a plurality of tail elements. The tail element is shaped as a flattened curl, which upon extension, as occurs when the lure is pulled through water, forms a lateral, reverse twist thereby causing the tail to vacillate and gyrate simulating natural bait movement.

While these devices achieve their particular objectives, they do not disclose a colorfast, silicone-based skirt dressing having a feathered distal portion. Elastomer dressings have become a dressing of choice for freshwater and saltwater lure manufacturers and it is desirable to provide a dressing formed of such material having bait movement simulating properties including pulsating or undulating motion.

SUMMARY OF THE INVENTION

Accordingly, it is a primary object of the present invention to provide a silicone-based skirt having a feathered distal portion coupled to a proximal portion through a tapered section or zone for creating a pulsating or undulating action in the skirt as it moves through the water.

It is a further object of the invention to provide a silicone-based skirt for creating a subtle motion or action in the feathered distal portion as it moves through the water.

Still yet another object of the present invention is to provide a silicone-based skirt for creating an undulating action as the skirt moves through the water.

Various of the foregoing objects, advantages and distinctions of the invention are particularly obtained in a silicone-based elastomer substrate which is formed into lure skirt or dressing that includes a plurality of slit, filamentary strips or tentacles. The filaments are bound together via a strap fastener or ring to form a skirt. The strap fastener creates or defines a plurality of filament first segments and a plurality of filament second segments. Each one of the plurality of filament first segments includes a proximal section, a distal section of reduced cross section, and a tapered living hinge section being disposed intermediate the proximal and distal sections.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of a typical skirt dressing.

FIG. 2 is a sectional view of a filament first segment taken along line 2—2 of FIG. 1.

FIG. 3 is a perspective view of the skirt dressing.

FIG. 4 is a sectional view of the skirt dressing taken along line 4—4 of FIG. 1.

FIG. 5 is an elevation view in partial cutaway showing the skirt dressing attached to a lure.

FIG. 6 is a sectional view of a filament first segment showing an alternative embodiment of the present invention.

DESCRIPTION OF THE PREFERRED EMBODIMENT

With reference now to the drawings, and in particular to FIGS. 1 through 5 thereof, a new elastomer fishing lure skirt embodying the principles and concepts of the present invention and generally designated by the reference numeral 10 will be described.

More specifically, it will be noted that the skirt 10 includes a plurality of generally rectangular filaments 12 formed from slitting a piece of sheet stock 14 which has been coated with a colorant and other chromatic elements. The filaments 12 are bound to one another at edge borders 16. A trap fastener 18 such as a rubber band or wire loop is secured to a position approximately ⅗ of the distance from a first end 20 of the skirt 10. In this arrangement the distal tip ends of each segment are generally co-terminus when the skirt 10 is in use. The edge borders 16 are then trimmed away and the skirt 10 is ready to be mounted over a hook and onto a lure as shown in FIG. 5.

In the preferred embodiment, the sheet stock material and the colorants and other chromatic elements are as disclosed in my U.S. Pat. No. 5,251,395. Further the sheet stock 14 is formed by conventional methods and colorized and otherwise prepared in accordance with the process disclosed therein. The sheet stock 14 preferably ranges in thickness from about 0.017 inches to about 0.0230 inches at its thickest portion to from about 0.008 to about 0.014 at its thinnest portion, the sheet stock having a tapered portion of appropriate length providing the transition between the thickest portion and the thinnest portion.

The strap fastener 18 defines a plurality of filament first segments 22 and a plurality of filament second segments 24. As shown in FIG. 3, each filament first segment 22 comprises approximately ⅗ of the total length of each filament 12 with the remaining ⅖ of the filament length comprising each filament second segment 24.

With particular reference to FIG. 2, a representative filament first segment 22 is shown including a proximal section 26, a distal section 28, and a tapered section 30 disposed intermediate the proximal section 26 and the distal section 28. The proximal section 26 is shown having a greater cross sectional dimension than the distal section 28, the tapered section 30 providing a graduated or graded tapered transition from the proximal section 26 to the distal section 28. In this manner a feathered portion of reduced cross section is formed in each filament first segment 22 which portion provides for the pulsating and undulating movement simulating live bait.

For use in conventional freshwater lures, the filament 12 is preferably 5.375 inches long. The distal section 28 is approximately 1.375 inches long and the tapered section 30 is approximately 0.25 inches in length. This creates a tapered section which is formed of a desired length to achieve the appropriate motion in the overall filament 12.

With reference to FIG. 6, an alternative embodiment is shown wherein a tapered section 32 is of lesser longitudinal dimension than the tapered section 30 described above and provides a stepped taper having a steeper grade.

In use, the skirt 10 is attached to a lure 40 of choice by conventional means as shown in FIG. 5. The strap fastener is attached to the lure 40 in such manner that the filament second segments 24 are positioned interiorly of the filament first segments 22. By providing for a 3:2 ratio in the lengths of the respective filament first segments 22 and the filament second segments 24, it is found that the filament ends are substantially aligned with each other when the skirt is in use. In this configuration the feathered portions of the filament first segments 22 are advantageously positioned exteriorly of the filament second segments 24 and provide the desired pulsating and undulating movement.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An elastomer fishing lure skirt comprising:
   (a) silicone based elastomer substrate separated into a plurality of elongated filaments of substantially uniform width and which collectively form a lure skirt;
   (b) a means for semi-permanently binding the elongated filaments to one another, the means for semi-permanently binding the filaments to one another defining a plurality of elongated filaments extending away from said binding means, with each filament comprising a first and a second segment; and
   (c) wherein each filament first segment further comprises a proximal section, a distal section, and an intermediate section having a tapered cross-sectional thickness and being disposed between said proximal and distal sections, and with said second segment of each filament being integrally coupled to and extending away from said first segment distal section to form each said elongated filament.

2. The elastomer fishing lure skirt of claim 1, wherein the distal section of the first segment of each filament is of smaller cross-sectional thickness than that portion of each filament comprising the proximal section.

3. The elastomer fishing lure skirt of claim 1, wherein the means for semi-permanently binding the filaments to one another is positionable upon the plurality of filaments in such manner that each first filament segment comprises about sixty percent of the total length of each filament.

4. The elastomer fishing lure skirt of claim 1, wherein the silicone based elastomer substrate further comprises a colorant containing a liquid silicone carrier coated onto an exposed surface of the substrate and thermally cured to the exposed surface.

5. The elastomer fishing lure skirt of claim 4 including a metalized foil and wherein regions of the cured colorant adhesively bond the foil to the exposed surface.

6. The elastomer fishing lure skirt of claim 4 including a plurality of coatings of a plurality of colorants, wherein each of the plurality of colorants contains a liquid silicone carrier and a suspended pigment, and wherein each of the coatings is applied in a pattern having a predetermined orientation to each other.

7. The elastomer fishing lure skirt of claim 4, wherein the cured colorant comprises a liquid silicone carrier containing a dispersed dry pigment which colorant is thermally cured to the substrate by exposure to a temperature in the range of 300 to 400 degrees Fahrenheit.

8. The elastomer fishing lure skirt of claim 1 wherein said intermediate section tapers uniformly along its length.

* * * * *